United States Patent [19]
Mathieu

[11] Patent Number: 5,998,764
[45] Date of Patent: *Dec. 7, 1999

[54] ILLUMINATING AND FASTENING SLEEVE FOR A CIGAR LIGHTER COMPRISING A FASTENING TONGUE EXTENSION FOR FACILITATING EASY REMOVAL

[75] Inventor: Daniel Mathieu, Mazamet, France

[73] Assignee: Valeo Vision, Bobigny Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/687,471

[22] PCT Filed: Dec. 13, 1995

[86] PCT No.: PCT/FR95/01655

§ 371 Date: Nov. 13, 1996

§ 102(e) Date: Nov. 13, 1996

[87] PCT Pub. No.: WO96/18521

PCT Pub. Date: Jun. 20, 1996

[30] Foreign Application Priority Data

Dec. 13, 1994 [FR] France ................. 94 15104

[51] Int. Cl.⁶ .................................................. B60N 3/14
[52] U.S. Cl. .................... 219/267; 219/269; 362/32; 362/92; 362/80

[58] Field of Search ....................... 219/260–270; 362/80, 92, 109, 32

[56] References Cited

U.S. PATENT DOCUMENTS

| | | |
|---|---|---|
| 3,903,408 | 9/1975 | Seibel et al. . |
| 4,079,242 | 3/1978 | Seibel ........................................ 362/32 |
| 5,029,048 | 7/1991 | von Gaisberg et al. . |
| 5,030,811 | 7/1991 | von Gaisberg et al. ................. 219/268 |

FOREIGN PATENT DOCUMENTS

| | | |
|---|---|---|
| 387773 | 9/1990 | European Pat. Off. . |
| 462900 | 12/1991 | European Pat. Off. . |
| 505690 | 9/1992 | European Pat. Off. . |
| 678419 | 10/1995 | European Pat. Off. . |
| 2235022 | 1/1975 | France . |
| 2451294 | 10/1980 | France . |
| 2595132 | 9/1987 | France . |
| 2605949 | 12/1988 | France . |
| 4202120 | 7/1993 | Germany . |

*Primary Examiner*—John A. Jeffery
*Attorney, Agent, or Firm*—Morgan & Finnegan, LLP

[57] ABSTRACT

The illuminating sleeve has at least one fastening tongue which is extended towards its front collar portion, so as to pass through the aperture in the fixed wall to which the illuminating sleeve is fastened.

7 Claims, 2 Drawing Sheets

ILLUMINATING AND FASTENING SLEEVE FOR A CIGAR LIGHTER COMPRISING A FASTENING TONGUE EXTENSION FOR FACILITATING EASY REMOVAL

BACKGROUND OF THE INVENTION

The present invention relates to illuminating and fastening sleeves for cigar lighters, and the like, especially for motor vehicles, such as described for example in FR-A-2 605 949, to which reference can be made for further detail.

As is known, a cigar lighter (FIG. 1) comprises a heating plug 2 having a movable knob 7 which carries a terminal shroud in which is mounted a heating resistance (not shown), with a lighter body 1 serving as a receptacle for the plug and an illuminating sleeve 3, which surrounds the lighter body 1 and which is arranged to be illuminated by the switch for the light and indicators of the vehicle.

In a manner known per se, the body 1 carries a bimetal strip together with electrical power supply components 5, 6, to set up an electric circuit when the knob 7 of the plug 2 is pushed in.

In this pushed-in position, the terminal shroud of the plug 2 is in engagement with the leaves of the bimetal strip, in a way that enables the heating resistance becomes hot.

Once the resistance reaches the desired temperature, the leaves of the bimetal strip dilate, releasing the shroud and the knob 7, which reverts to its initial position under the action of a return spring (not shown). It only remains to remove the plug 2 so that a cigarette, or a cigar, can be lit.

The body of the illuminating sleeve 3 is provided on its front face with an illuminating collar portion 4 which surrounds the mouth of the lighter body 1.

In a manner known per se, this sleeve carries at its rear end a light source such as an electric bulb 9, which is carried by a housing 10 mounted on the rear end of the sleeve.

The sleeve 3 is made of a material which is conductive to light, and is typically made of a synthetic material such as a plastics material.

By virtue of its collar portion 4 it enables the plug 2 to be located at night, as the sleeve 3 is illuminated by the bulb 9. Apart from this illuminating function, the sleeve 3 also fastens the lighter body 1 to a fixed wall 11 of the vehicle, such as the fascia or a console of the latter.

In this connection, the sleeve 3 has at least one resiliently deformable fastening tongue 13, which is also referred to as a repelling lug. This tongue 3 is wedge-shaped, and has a knurled and inclined front face 14.

Once the sleeve 3 has been fitted in the aperture 15 formed for this purpose in the wall 11, the wall 11 is sandwiched between the collar portion 4 and the inclined front face 14 of the tongue 13.

In a manner known per se, during the fitting of the cigar lighter on the wall 11, the sleeve 3 is first inserted from the front into the aperture 15 in the wall 11, and the lighter body 1 is then introduced into the inside of the sleeve 3.

During the initial fitting of the sleeve 3 on the wall 11, the tongue 13 is retracted by cooperation of its inclined rear face 16 with the edge of the aperture 15.

The sleeve 3 typically has nibs (which are not shown here), which are adapted to cooperate with complementary apertures formed in the lighter body, in the manner disclosed in the above mentioned FR-A-2 605 949.

More precisely, these apertures are formed in a barrel 17, which is typically of metal, of the lighter body 1.

The fitting of the lighter body 1 inside the sleeve 3 is thus carried out by snap-fitting, in which the above mentioned nibs of the sleeve 3 penetrate into the complementary apertures in the barrel 17.

After this snap-fitting, the terminal collar portion 18 which is formed on the barrel 17 at its front end, comes into abutment against the collar portion 4.

In order to dismantle the assembly consisting of the barrel 17 and sleeve 3, a tool is introduced into the inside of the barrel 17, and the nibs of the sleeve 3 are then urged outwardly apart, so that the lighter body 1 can be extracted.

Although it only remains then to extract the sleeve 3, its removal is not so easy.

In this connection, it is necessary, after the body 1 has been extracted in the manner described above, to take hold of the tongue 13 from inside, and to deform it towards the axis of the sleeve 3, while pulling on it in order that the tongue 13 can pass into the aperture 15 and through the latter.

BRIEF SUMMARY OF THE INVENTION

The object of the present invention is to mitigate this drawback, and accordingly to facilitate removal of the illuminating sleeve.

In accordance with the invention, the fastening tongue is extended towards the collar portion of the illuminating sleeve, and the collar portion has a local opening to give access to the extension.

Thus, the invention enables the fastening tongue to pass to the other side of the fixed wall, which permits easier removal.

In this connection, because of the opening in the collar portion, it is possible to gain access to the extension, for example with the aid of a tool. The extension is preferably of L-shaped form, such that its transverse portion is easily accessible from outside, being protected by the front collar portion of the illuminating sleeve.

It now only remains to exert a force on this transverse portion in order to retract the fastening tongue inwardly, and to extract the illuminating sleeve.

It will be appreciated that the fastening tongue is easily made by moulding integrally with the illuminating sleeve, preferably in a plastics material, and that the extension extends locally into the collar portion of the illuminating sleeve.

The following description illustrates the invention with reference to the attached drawings.

DETAILED DESCRIPTION OF THE INVENTION

For simplicity, those elements which are common to the prior art and to the present invention are given the same reference signs.

Figure 3:
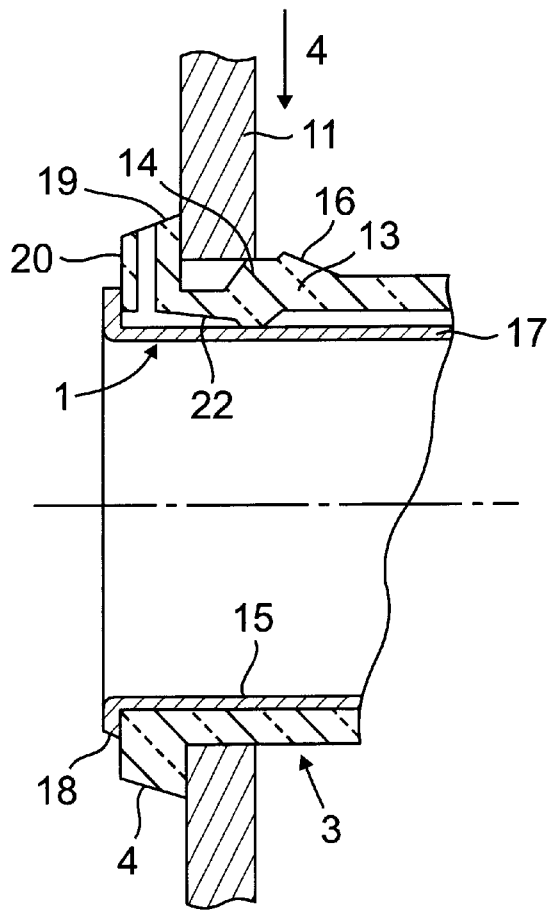
FIG. 3 is a view similar to FIG. 2, and shows a fastening tongue in accordance with the invention.

Thus, in FIG. 3, there is shown at 13 the fastening tongue 13 of the illuminating sleeve 3, made of a plastics material which is conductive to light, at 4 the front collar portion of the sleeve 3, and at 17 the barrel of the lighter body 1. The tongue 13 is wedge-shaped, and has a knurled, inclined front face 14 and an inclined rear face 16. The barrel 17 has at its front end a collar portion 18 which extends transversely away from the axis of the assembly.

Once the assembly consisting of the sleeve 3 and the lighter body 1 has been fitted into the central aperture 15 of the fixed wall 11 of the vehicle, the wall is sandwiched between the collar portion 4 and the knurled front face 14 of the tongue 13.

Thus, after being fitted, the front face of the collar portion 4 is in contact with the collar portion 18 (i.e. the rear face of the latter), while the rear face of the collar portion is in engagement against the front face of the fixed wall 11.

In accordance with the invention, the fastening tongue 13 is extended towards the collar portion 4 of the illuminating sleeve 3, and the collar portion 4 has a local opening in order to give access to the transverse and axial portions of the extensions, 19, 22.

Thus, as can be seen in the said FIG. 3, the tongue 13, or repelling lug, is extended so as to pass to the other side of the fastening wall 11, that is to say into the cabin side of the vehicle.

In this example, the extension 19, 22 is L-shaped, and accordingly the axial portion 22 extends through the wall 11, together with the generally transverse portion 19 which projects away from the axis of the assembly that consists of the lighter body 1 and the sleeve 3.

The axial portion of the extension 22 lies in the aperture 15, while the transverse portion of the extension 19 extends parallel to the wall 11 and collar portion 4.

In this example the tongue 13 is formed by molding with the sleeve 3 in a plastics material which is translucent.

This tongue 13, which is half cut out, is orientated generally axially, and is obtained by the formation of a slot 21 in the annular body of the sleeve 3. The slot 21 also extends into the collar portion 4, and is formed at the level of the root zone in which the tongue 13 is fixed to the body of the illuminating sleeve 3.

The thickness of the collar portion 4 is reduced in the region of the extensions 19, 22.

The collar portion 4 thus has a reduced local thickness 20, facing the transverse extension portion 19, which constitutes a lug for release of the snap fit.

In this example, this portion 19 does not bear on the wall 11 after the above mentioned fitting operation, and there is an axial clearance between the portion 19 and the collar portion 4.

Figure 4:
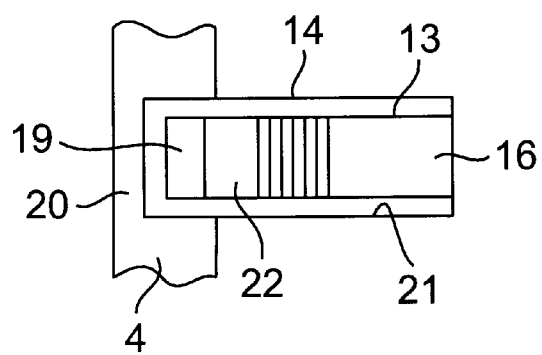
FIG. 4 is a partial view in the direction of the arrow 4 in FIG. 3.

As can be seen in FIG. 4, the tongue 13 is of generally rectangular form, and is joined to the sleeve 3 through its rear portion. The slot 21 leaves a clearance between, firstly, the tongue 13 and secondly, the body of the sleeve 3 and the collar portion 4, and penetrates locally into the latter.

Because of the slot 21, the portion 19 is able to extend up to the vicinity of the collar portion 4.

Thus the assembly consisting of the lighter body 1 and sleeve 3 is carried out in the same way as in the prior art, that is to say the sleeve 3 is first snap-fitted into the aperture 15 of the wall 11, with the rear face 16 of the tongue 13 then cooperating with the edge of the aperture 15 so that the lug or tongue 13 is retracted inwardly, and the tongue 13 can pass through the aperture 15.

In the initial state, the tongue 13 projects towards the interior of the sleeve 3.

Subsequently, the barrel 17 of the lighter body is inserted into the aperture of the sleeve 3, the result of which is that the tongue 13 is pushed radially outwardly, to produce a clearance between the portion 19 and the wall 11.

This movement is continued until the collar portion 18 of the barrel 17 comes into engagement against the front surface of the collar portion 4, the rear face of which is in engagement against the wall 11 except in the region of the extension 19, 22.

In order to disengage the barrel 17, pressure is exerted on the knurls of the sleeve 3 with the aid of a tool, in the manner described above, in order to disengage the knurls of the sleeve 3 from the complementary openings formed in the barrel 17.

The barrel 17 and the lighter body 1 can then be extracted.

After this extraction it is sufficient to push on the portion or lug 19 of the extensions 19, 22 in order to push the tongue 13 radially inwardly and to extract the sleeve 3 easily.

The number of tongues 13 does of course depend on the application. In the present example, three lugs 13 are provided, which are spaced apart at regular intervals on a circle.

It will be noted that the collar portion 4 is frusto-conical in form, and that the portion 19 is formed somewhat as a frustum of a cone of the collar portion 4, so that it is deeper than the reduced thickness zone 20 of the collar portion 4.

The present invention is of course not limited to the embodiment described. Thus, it is possible to omit the portion 19 and to act on the axial portion 22 of the extension, using a tool which is introduced into the free space that exists between the wall 11 and the reduced thickness zone 20 of the collar portion 4.

This solution is of less advantage, as will be understood.

Conventionally, the barrel 17 of the body 1 carries the bimetal strip of the cigar lighter, together with the electrical power supply components. In a modified version, the cigar lighter may have two barrels, namely a lighter barrel carrying the bimetal strip and a masking barrel which surrounds the lighting barrel.

In that case, the tongues 13 are arranged to be pushed by the masking barrel.

Instead of being oriented axially as in FIGS. 1 to 4, the tongues 13 may of course be oriented transversely and include extensions 19, 22.

All combinations are of course possible, and the sleeve 3 may for example have two axially oriented fastening tongues, together with a transversly oriented fastening tongue, or vice versa.

Finally, the fixed wall 11 may for example be the fascia, a console, or the bulkhead of the vehicle.

Figure 1:
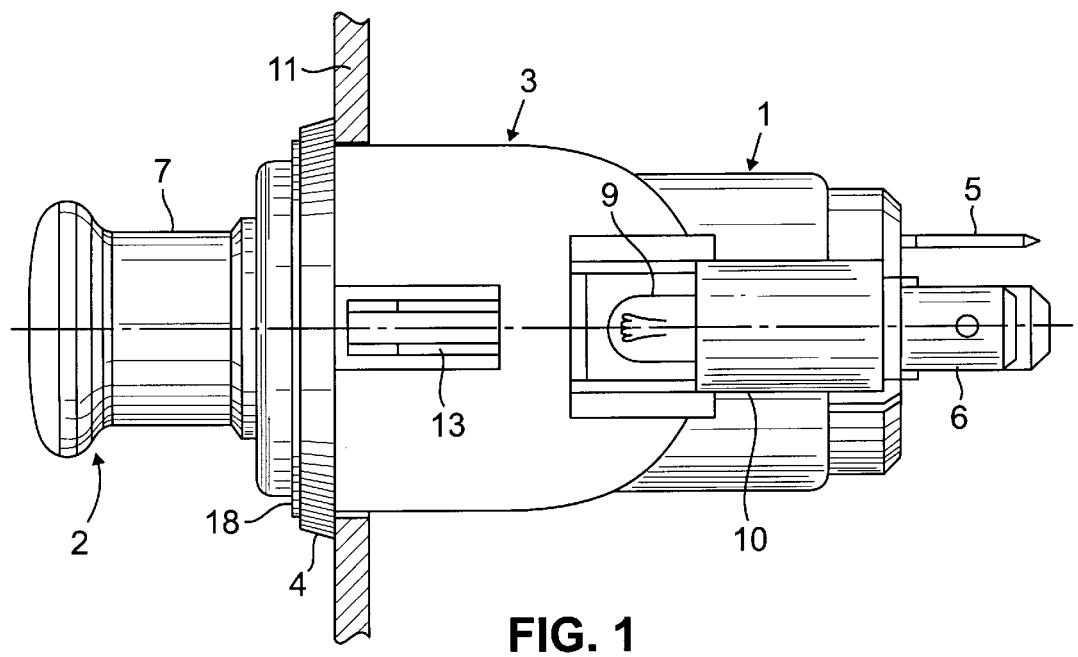
FIG. 1 is a view of a cigar lighter of the prior art.
Figure 2:
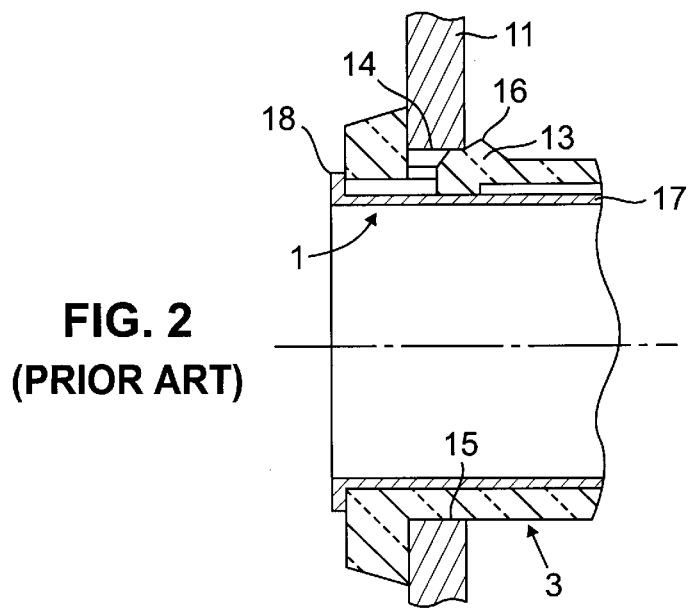
FIG. 2 is a view in axial cross section showing part of the cigar lighter of FIG. 1.

In all cases, it will be noted that the collar portion 4 continues to be illuminated generally homogeneously by the bulb 9 of FIG. 1, while the arrangement that comprises an L-shaped extension is the most preferable.

I claim:

1. An illuminating and fastening sleeve for a cigar lighter, especially for motor vehicles, having a collar portion, the sleeve having at least one slot extending through the sleeve, the slot defining a resiliently deformable fastening tongue extending partially around the circumference of the sleeve, said collar portion having a rear face for cooperating with the front face of the fixed wall, the tongue having a first end joined to the sleeve and a second end disconnected from the sleeve and directed toward the collar portion, the second end for cooperating with a partial circumferential portion of the rear face of the wall, characterized in that the slot extends into the collar portion, defining an extension from the second end of the fastening tongue directed towards the collar portion, the extension being disconnected from the sleeve, and said collar portion has an opening for enabling access to said extension, whereby the at least one fastening tongue passes through the fixed wall via said extension such that a leading portion of the extension closest to the collar portion is between the collar portion and the front face of the fixed wall, the extension has a rear face for cooperating with a partial circumferential portion of the front face of the fixed wall, and the opening in the collar portion is between a partial circumferential portion of the collar portion and the front face of the fixed wall, proximate the extension, when the sleeve is supported by the fixed wall.

2. A sleeve according to claim 1, characterized in that the extension extends into the collar portion of the illuminating sleeve and the opening is between the partial circumferential portion of the collar portion and the leading portion of the extension when the sleeve is supported by the fixed wall.

3. A sleeve according to claim 1, characterized in that the extension comprises an axially oriented portion extending through the fixed wall.

4. A sleeve according to claim 3, characterized in that the leading portion of the extension is L-shaped and includes an axial portion connected to a transversely oriented portion for cooperating with the partial circumferential portion of the front face of the fixed wall.

5. A sleeve according to claim 1, characterized in that the collar portion is of reduced thickness in the region of the extension.

6. A sleeve according to claim 5, characterized in that the reduction in thickness of the collar portion is defined by the slot.

7. A sleeve according to claim 6, in which the fastening tongue is oriented generally axially, characterized in that the slot is closed in the area in which the fastening tongue is joined to the body of the illuminating sleeve.

* * * * *